United States Patent

[11] 3,618,639

| [72] | Inventors | Daniel R. Daley<br>Orlando;<br>Clark J. Crooker, Windermere; Thurman Soles, Orlando, all of Fla. |
|---|---|---|
| [21] | Appl. No. | 879,256 |
| [22] | Filed | Nov. 24, 1969 |
| [45] | Patented | Nov. 9, 1971 |
| [73] | Assignee | Cues, Inc.<br>Orlando, Fla. |

[54] PACKER FOR SEALING PIPE LEAKS
6 Claims, 5 Drawing Figs.

[52] U.S. Cl. .................................................. 138/97, 138/93
[51] Int. Cl. ........................................... F16l 55/10, F16l 55/18
[50] Field of Search .......................................... 138/97, 90, 91, 93

[56] References Cited
UNITED STATES PATENTS

| 2,481,013 | 9/1949 | Henderson | 138/90 |
| 3,103,235 | 9/1963 | Stringham | 138/97 |
| 3,194,466 | 7/1965 | Davis | 138/90 X |

Primary Examiner—Laverne D. Geiger
Assistant Examiner—Richard J. Sher
Attorney—Duckworth & Hobby ABSTRACT: A packer apparatus for the internal sealing of pipe leaks is made up of easily assembled and disassembled components. A pair of casings is covered with inflatable skins and have a center ring between them and an end skid member at each end of the mechanism. Bolts connecting the two end members tighten the mechanism together in a manner to seal both ends of the inflatable skins covering the casings so that both skins may be inflated on either side of the center ring and when inside a pipe to provide a void area for rapid grouting by the passing of chemicals through the center ring. Thus the unit may be easily assembled and disassembled by the attachment and removal of the bolt between the end of the mechanism whereby parts may be easily replaced in the field and the inflatable skin does not have to have holes therein for anchoring it to the casing.

PATENTED NOV 9 1971

DANIEL R. DALEY
CLARK J. CROOKER
THURMAN SOLES
INVENTORS

BY Duckworth & Hobby

Attorney

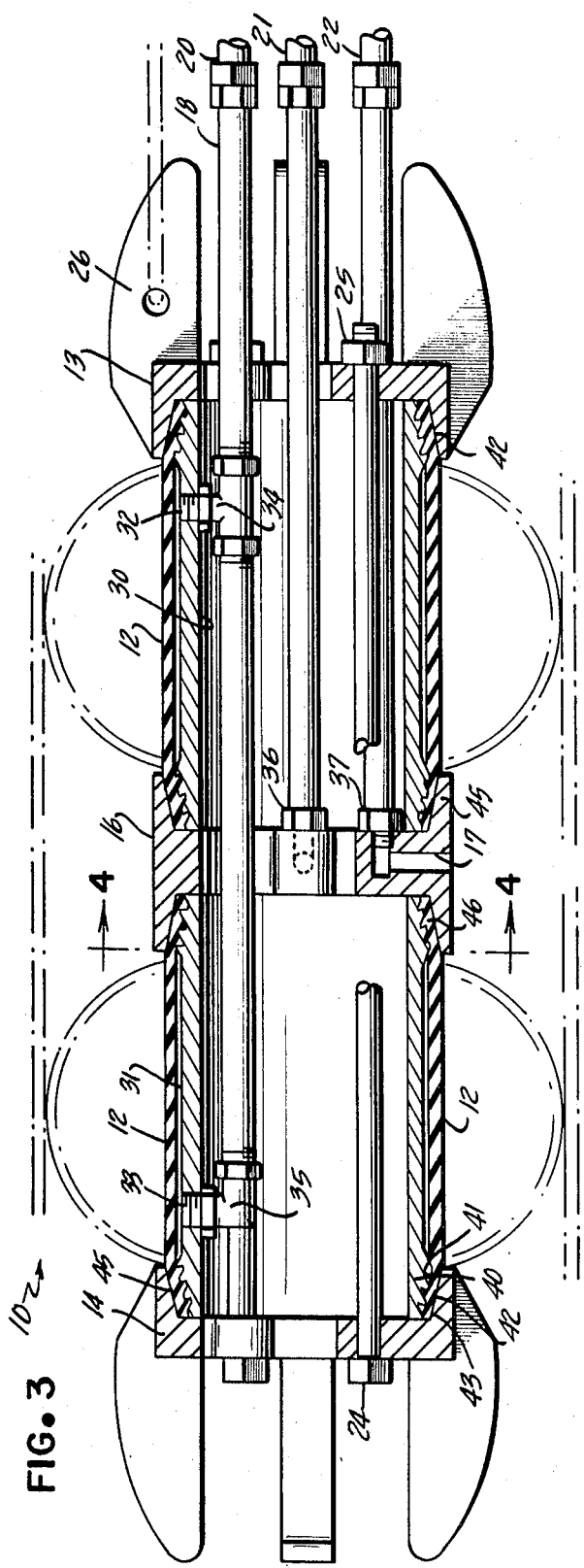
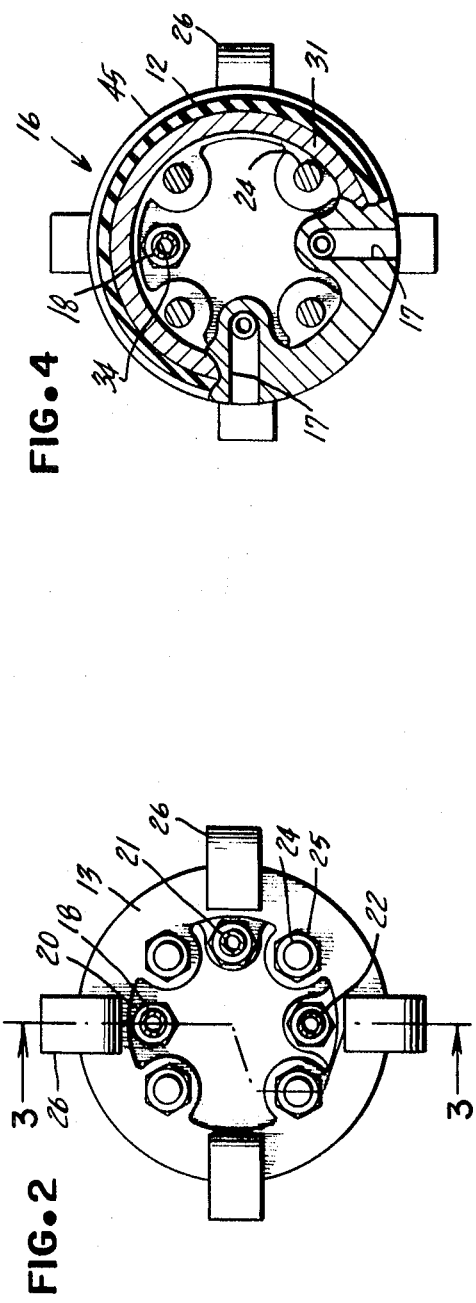

PACKER FOR SEALING PIPE LEAKS

BACKGROUND OF THE INVENTION

1. Field of the Invention

The present invention relates to the internal sealing of pipe leaks and especially to sleeve-type packers for use with fast setting chemical grouts. The present packer apparatus is especially adapted for use in those systems in which a television camera in a sealed unit may be pulled through a sewerline, or the like, to detect leaks or faults in the sewer line and assist in the positioning of the packer for a fast and easy sealing of the leak by remote control from a mobile unit located near the entrance of the sewerline.

2. Description of the prior Art

Pipes such as sewerlines, frequently develop leaks, particularly at the joints between sections of the pipe. Prior to the development of television cameras and internal pipe sealing units, the repair of subterranean pipelines to correct the infiltration of water, and the egress of sewage, had been to calculate strategic locations of infiltration and then to excavate along the pipeline until the leak was located and the repair made. This, however, was time consuming and expensive in the correction of faults in subterranean lines, and it was extremely difficult to locate the exact site of a leak in the pipe. This resulted in experimentations for better ways of locating leaking joints and resulted in sealed camera units, such as TV cameras having lighting units for pulling through the pipelines to examine the interior of the pipelines for faults, root damage, and the like. Once a fault or leak was discovered in the pipe and pinpointed with a camera, a hole could be drilled to a spot near the leak and sealing the material fed through conduits would repair the leak. This particular method and apparatus was described in the claims in U.S. Pat. No. 2,971,259, entitled METHOD AND APPARATUS FOR DETERMINING THE POSITION OF SEWER LEAKS by Robert F. Hanou and Edward Diehle Toole, and assigned to the assignee of the present invention.

The next step involved the development of a mechanism for internally sealing a pipe leak, having a packer movable within the pipe along its length for injecting a plugging material into the leak. Such a packer was described in U.S. Pat. No. 3,168,908 for MECHANISM FOR THE INTERNAL SEALING OF A PIPE LEAK by James A Zurbrigen and Jack C. Steinsberger and assigned to the assignee of the present invention. This type of sealing packer was used in association with an enclosed television camera to provide a method for sealing and repairing internal leaks in sewerlines by moving the packer along the pipe until a leak was detected by the television camera, and a target located a fixed distance from the packer positioned under the leak, then advancing the packer a predetermined distance to place the packer directly over the leak, then isolating the leak with the packer and injecting the sealing material. This method was illustrated in U.S. Pat. No. 3,168,909 for A METHOD FOR LOCATING AND SEALING PIPE LEAKS by James A. Zurbrigen and Jack C. Steinsberger, and assigned to the assignee of the present invention. Finally an improved packer mechanism for use for fast gelling chemical grout was provided in the U.S. Pat. No. 3,103,235 entitled SLEEVE PACKER FOR CHEMICAL GROUTING by Edward B. Stringem III, and assigned to the assignee of the present invention in which a sleeve-type packer was provided having a sleeve covered by an inflatable bladder and sealed at each end, and having another rigid sleeve placed over the bladder and in the middle thereof, to provide a packer adapted for fast gelling grouts.

A principal object of the present invention is to provide an improved packer apparatus for fast gelling grouts which is simple, sturdy, leakproof and adapted for rapid operation, and especially easy assembly and disassembly of the unit and for replacing defective damage or wornout parts such as the inflatable bladder simply and in the field if desired.

SUMMARY OF THE Invention

A pipe leak sealing mechanism is provided having a pair of open casings covered by air-impervious inflatable skins, a skid end member is placed next to one end of each of the inflatable skin-covered casings, and the other end of each casing is placed against a center ring member. Attaching means such as bolts are then passed from one end member through the open portion of the casing to the other end member, which then bolts the whole apparatus together. The inflatable skins over the casings are sealed at each end by the tightening of the end members together, which tightens the skins to each casing by beveled and serrated edge at the end of the casing in conjunction with an overlapping portion of the end members which portions are angled from the ends of the casings and tightened to uniformly compress the skins against the beveled and serrated edges of the casings. The center ring member has a similar overlapping edge on both sides thereof to simultaneously tighten and seal the other end of the inflatable skin to the other end of each casing in a similar manner. The unit may be easily disassembled by loosening the bolts passing through the end members and replacing a worn out or defective part and then rebolting the unit together; thus there is no requirement that the inflatable skins be cut through to provide the usual troublesome point at which the inflatable skin would tear or wear out while a very rapid operating inflatable skin may be utilized. Air is provided through the casings under pressure to inflate the inflatable skins to form a void between the center ring and the interior of the pipe and isolated by the pair of inflated bladders or skins and a rapid setting grouting material may then be fed through the center ring for the sealing operation.

BRIEF DESCRIPTION OF THE DRAWINGS

Other objects, features, and advantages of this invention will be apparent from a study of the written description and the drawings in which:

FIG. 2 shows a sectional view taken along line 2—2 of FIG. 1;

FIG. 3 shown a cutaway sectional view taken along line 3—3 of FIG. 2;

FIG. 4 shows a cutaway sectional view taken along line 4—4 of FIG. 3; and

DESCRIPTION OF THE PREFERRED EMBODIMENTS

Figure 1:
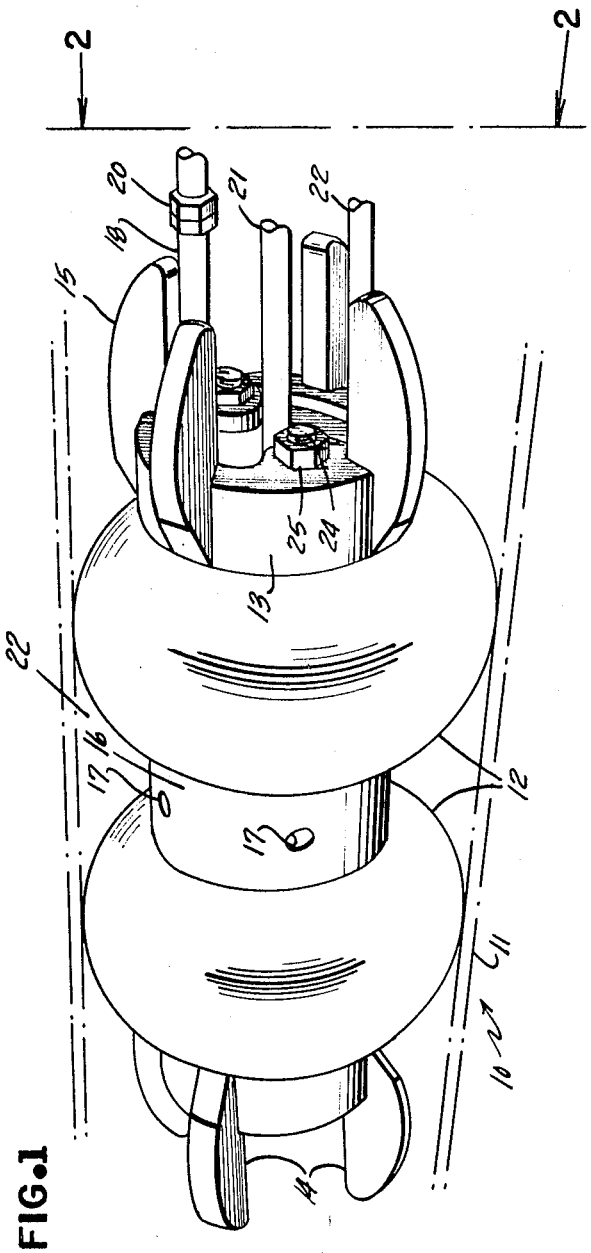
FIG. 1 shows a perspective view of one embodiment of the present invention.

FIG. 1 shows a perspective of one embodiment 10 of the present invention indicated in a pipe line 11 having a pair of inflated bladders 12 which in their inflated position would be generally flat or annular skins or sleeves, but which are easily inflatable with air pressure. At each end of the packer 10 are end members or skids 13 and 14 having a plurality of skid legs 26 for sliding the packer in pipe 11 when the skins 12 are not inflated. A center ring member 16 is provided between the inflated skins 12 and have a pair of openings 17 therein. A hose 18 having a coupling 20 is shown entering one end of the packer 10 and may be an air pressure or other fluid pressure line which is connected to and passes through casings located under the bladder 12, but which casings may not be seen in this view. Thus by applying pressure through hose 18, both bladders 12 are simultaneously inflated and simultaneously deflated. A pair of additional hoses 21 and 22 are also shown entering the packer 10 and carry the grouting chemicals for sealing a fault or leak in a pipe 11. Hoses 18, 21 and 22 would extend along the length of the pipe 11, which would normally be a subterranean pipe, back to the surface or entrance thereto where equipment would be located for providing the air pressure to hose 18 and the chemicals for hoses 21 and 22. The chemicals entering hoses 21 and 22 will pass through holes 17 and ring 16 to fill the void 23 created between pipe 11, the ring 16 and the two inflated bladders. Bolts pass from end member 14 to skid 13 for bolting the apparatus together with nuts 25, as will be described in more detail later.

At this point it will be clear that the present packer operates by locating a fault in a pipe 11 by the use of a device such as an enclosed television camera having a target so that the exact point of the leak may be pinpointed and the packer accordingly positioned at that point, preferably with ring 16 located directly over the leak. The bladders 12 may be inflated by air pressure through hose 18 to provide a void space 23 isolating the leak and chemicals may be injected through hoses 21 and 22 and out hole 17 under sufficient pressure to force the chemicals into the pipe fault. The chemicals would preferably be of a rapid gelling or setting type, would harden quickly and the packer moved to the next leak in the pipe.

It will of course be clear to those skilled in the art that the present apparatus would advantageously be used with a television camera apparatus connected to the front thereof and pulled through the pipe by a winch, or the like, and that it might be desirable to clean the pipes or sewerlines prior to performing the repair work.

Referring now to FIG. 2, an end view is shown taken along line 2—2 of FIG. 1 and showing the end member or skid 13 having a plurality of curved sliding surfaces 26 for sliding the packer inside a pipe or sewerline, or the like, and held to the apparatus by a plurality of bolts 24 and nuts 25, and having a hose 18 coupled at 20 entering the packer apparatus similar to the hoses 21 and 22 also entering the packer from the end.

It will be clear that while a certain shape for skid sliding members 26 is illustrated, that other types or shapes of skids could also be used without departing from the spirit and scope of the present invention, it being only necessary that the skids not interfere with the operation of the bladder 12.

FIG. 3 shown a view taken along line 3—3 of FIG. 2 with the packer 10 and a pipe 11 having a fault 26 in need of repair. The packer 10 has the end member 13 and 14 having skid surfaces 26, center ring 16, with holes 17 therein and having air pressure hose 18 coupled at 20 entering the packer along with chemical hoses 21 and 22. As can be seen from this view, a pair of hollow generally cylindrical shaped casings 30 and 31 are located beneath the inflatable air-impervious skin 12 and have openings 32 and 33 passing therethrough for connecting a pair of couplings 34 and 35 from the airholes 18 for providing air at elevated pressures through casings 30 and 31 into the space between casings 31 and the inflatable skin 12. Hoses 21 and 22 on the other hand are connected at 36 and 37 to the ring 16 for allowing the chemicals passing through hoses 21 and 22 to pass out holes 17 into the void space 23 for sealing the fault 26.

As can clearly be seen in this view, the bolts 24 pass between end members 14 and 13 with nuts 25 tightening them toward each other and in fact pull the entire apparatus together, since the pulling of these two end members 13 and 14 towards each other tightens them against the end of sleeves 30 and 31 which in turn tightens the other end of sleeves 30 and 31 against the center ring 16 thus providing the only means necessary for holding the packer assembly together. It will of course be necessary that the skins or sleeves 12 have airtight seals at either end of casings 30 and 31, and this is provided by having casings 30 and 31 with beveled or angular end portions 40 at each end of each casing and also by providing this beveled edge with serrations 41 for holding the sleeves 12 when an equal amount of pressure is applied thereonto and pushing it against the beveled ended, serrated edges 40 and 41. This pressure is provided by an overlapping portion 42 on each end member 13 and 14 and a similar angled overlap 45 on both sides of ring 16. The angle illustrated at 43 is different from the beveled edge angle on 41 on casings 31 and 30 thus as bolts 24 draw ends 13 and 14 towards each other, the angled end 42 on the end members and 45 on the center member being at different angles tighten down on both ends of each skin 12. It has been found that by tightening bolts 24 to the correct torque will produce a force applied by overlapping portions 42 and 45 and beveled ends 40 to the impervious skin 12 in a manner to give a long lasting seal which does not tend to wear out or break as easily as when holes are drilled through a rubber type material. The skins 12 could of course be made of various types of rubber or a synthetic rubberlike material, but generally is chosen for the particular packer and it has been found that natural rubber having a ⅜-inch wall thickness has operated satisfactorily for a packer for use to a 10-inch pipe and while generally any material can be used which has sufficient hardness for the casings 30 and 31 and skids 13 and 14 and ring 16, it has been found that aluminum alloys operate satisfactorily for the casings 30 and 31 and that aluminum magnesium alloys operate advantageously for the skids 13 and 14 as well as for the ring 16.

It will be clear to those skilled in the art at this point that a packer has been provided which may be easily assembled and disassembled as desired and which parts, such as the rubber sleeves 12, may be easily replaced and are adapted for rapid operation because of the advantageous way that the sleeves are held in an airtight seal to the casing 30 and 31 without having holes drilled therein and other holding means having uneven applications of force to the end sealing means.

Referring now to FIG. 4, there can be seen a view taken along line 4—4 of FIG. 3 in which the skid members 26 can be seen as can holes 17 angled overlapping portions 45 on ring 16, rubber sleeve 12 and casings 31, and also having a plurality of bolts 24 passing therethrough, and a cutaway portion of the air pressure hose 18 with coupling 34. It will of course be clear that the ring 16 is a separate component held into the packer apparatus 10 by drawing of the end members together with bolts 24 but which also have lines 21 and 22 attached thereto for passing the chemical grouting materials therethrough.

Figure 5:
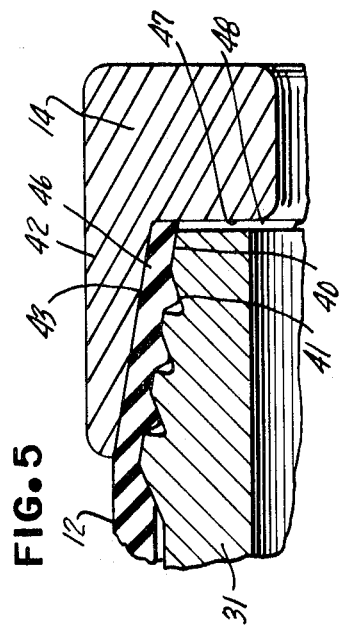
FIG. 5 shows a cutaway sectional view of the means for sealing the inflatable skins to the casings.

FIG. 5 shows in more detail the sealing of the bladders 12 to the casing 31 which casing has a generally angled or beveled edge 40 with serrated teeth 41 with the end of the bladder 46 shown overlapping the serrated edges 41 and the end member 14 having an overlapping portion 42 for overlapping end 46 of bladder 12 with an angled edge 43 which is at a different angle than the angle of beveled edge 40, but which angle could be the same as that of beveled edge 40. As the annular edge 47 of the end member 14 is pulled toward the end 48 of casing 31 the tapered lock between 43 of the overlapping portion 42 and 40 of the casings 31 will tighten the end of bladder 46 against serrated edges 41 with a sufficient pressure to hold it in an airtight manner but without damaging the rubber in the bladder 12. This particular means of holding a pair of air-impervious inflatable skins to a casing has been found to provide a bladder that can be rapidly inflated and deflated without damage or undue wear to the bladder and at the same time to provide a bladder which may be rapidly interchanged when worn or damaged without replacing the whole packer or going to extensive replacement operations in a shop. The bladder can of course be easily replaced in the field and also provides an economical assembly in the manufacture of the packer.

At this point, it should be pointed out that while an improved packer has been disclosed, it is intended that other embodiments are to be covered, such as having different size packers for different size pipes or sewerlines. It is anticipated that the packers can be used in other pipes than sewerlines and can be made of any material desired which will perform the particular functions required and that the bladders could also be secured at their ends with an adhesive bond.

Accordingly, this invention is not to be construed as limited to the particular forms disclosed herein since these are to be regarded as illustrative rather than restrictive.

We claim:

1. A pipe leak sealing mechanism comprising in combination:

a. a pair of open cylindrical casings having beveled end portions, said beveled end portions having serrations thereon;

b. a pair of air-impervious inflatable skins, one said skin mounted on each said casing;
c. center ring member;
d. a pair of end members each said end member having a portion overlapping one said beveled end of one said casing and one end of the inflatable skin thereon;
e. attachment means attaching each said casing having one said skin thereon, between one said end member and said center ring member, in a manner to seal each said skin to each end of one said casing whereby fluid under pressure supplied between each said casing and the skin mounted thereon will inflate each said skin producing a void between said center ring member and the interior of a pipe between said pair of inflated skins; and
f. means for directing settable chemicals through said center ring members whereby said chemicals may flow into said void for sealing a leak in a pipe.

2. The apparatus according to claim 1 in which said attachment means includes a plurality of bolts passing through said end members and adapted to be tightened by nuts thereby pulling said end members toward each other compressing said casings, center ring member and end members together.

3. The apparatus in accordance with claim 2 in which said end members are skids for said mechanism to ride on when propelled through a pipe.

4. The apparatus according to claim 2 in which said center member has a pair of annular portions, one said annular portion overlapping the other end of each said casing and the other end of the skin mounted thereon whereby each said skin is sealed to the other end of said casing by the other end of each said casing one overlapping portion of said center ring being drawn together.

5. The apparatus according to claim 4 in which each said casing has at least one opening therein for passing a fluid into the space between each said casing and the skin mounted thereon for inflating said skin.

6. The apparatus according to claim 5 in which an air pressure line is connected to each said opening in said casing for inflating said skins with air.

* * * * *